(12) United States Patent
Estrada et al.

(10) Patent No.: US 8,533,622 B2
(45) Date of Patent: Sep. 10, 2013

(54) INTEGRATING DIGITAL BOOK AND ZOOM INTERFACE DISPLAYS

(75) Inventors: Julio Estrada, Medina, WA (US); Lutz Gerhard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 12/486,499

(22) Filed: Jun. 17, 2009

(65) Prior Publication Data
US 2010/0325573 A1  Dec. 23, 2010

(51) Int. Cl.
G06F 3/048 (2006.01)
G06F 3/0483 (2013.01)

(52) U.S. Cl.
CPC .................... *G06F 3/0483* (2013.01)
USPC ............ 715/776; 715/778; 715/801; 345/173

(58) Field of Classification Search
USPC ................... 715/776, 778, 801; 345/173–179
See application file for complete search history.

(56) References Cited

U.S. PATENT DOCUMENTS

| | | | |
|---|---|---|---|
| 6,111,667 A * | 8/2000 | Mishima et al. ............... | 358/488 |
| 6,262,732 B1 * | 7/2001 | Coleman et al. ............... | 715/835 |
| 6,295,639 B1 * | 9/2001 | Van Der Meer ............... | 717/103 |
| 6,331,840 B1 * | 12/2001 | Nielson et al. ................. | 345/1.1 |
| 6,486,895 B1 * | 11/2002 | Robertson et al. ............ | 715/776 |
| 6,545,669 B1 * | 4/2003 | Kinawi et al. ................. | 345/173 |
| 7,345,688 B2 | 3/2008 | Baudisch et al. | |
| 7,552,398 B2 * | 6/2009 | Bier et al. ...................... | 715/800 |
| 8,218,190 B2 * | 7/2012 | Kanaya et al. ............... | 358/1.18 |
| 2004/0140975 A1 * | 7/2004 | Saito et al. .................... | 345/418 |
| 2005/0188326 A1 * | 8/2005 | Ikeda ............................. | 715/788 |
| 2007/0006073 A1 | 1/2007 | Gerhard et al. | |
| 2008/0040680 A1 * | 2/2008 | Lee ................................ | 715/764 |
| 2008/0201666 A1 | 8/2008 | Park et al. | |
| 2008/0222273 A1 | 9/2008 | Lakshmanan et al. | |
| 2009/0070704 A1 | 3/2009 | Ording | |
| 2009/0193356 A1 * | 7/2009 | Saba ............................. | 715/801 |

FOREIGN PATENT DOCUMENTS

| | | | |
|---|---|---|---|
| CN | 101123775 | | 2/2008 |
| EP | 1217508 | | 6/2002 |
| JP | 1999232295 A | | 8/1999 |
| JP | 2006-313485 | * | 11/2006 |
| KR | 100888402 B1 | | 3/2009 |
| WO | 2005022502 A1 | | 3/2005 |

OTHER PUBLICATIONS

Card et al., 3Book: A 3D Electronic Smart Book, May 25-28, 2004, ACM.*

(Continued)

*Primary Examiner* — Kieu Vu
*Assistant Examiner* — James T Durkin
(74) *Attorney, Agent, or Firm* — Wolfe-SBMC

(57) ABSTRACT

In accordance with one or more aspects, different pages of a digital book are displayed in each of two display areas of a device using a book display model. In response to a request to semantically zoom out, the digital book is displayed in a broader context, the broader context using a context display model rather than the book display model. In response to additional requests to semantically zoom out, the digital book is displayed in increasingly broader contexts. Additionally, in response to requests to semantically zoom in, the digital book is displayed in increasingly narrower contexts until the digital book is displayed in the book display model rather than the context display model.

20 Claims, 10 Drawing Sheets

(56) References Cited

OTHER PUBLICATIONS

Jarukasemratana, Sorn, "Multiple Views map on Nintendo DS", Retrieved at <<http://www.cs.uta.fi/research/theses/masters/Sorn.pdf>>, Master's Thesis, Department of Computer Sciences, University of Tampere, Apr. 2008, pp. 71.

Buering, et al., "User Interaction with Scatterplots on Small Screens—A Comparative Evaluation of Geometric-Semantic Zoom and Fisheye Distortion", Retrieved at <<http://hci.uni-konstanz.de/~buering/pdfs/infovis2006.pdf>>, IEEE Transactions on Visualization and Computer Graphics, vol. 12, No. 5, Sep. 2006, pp. 8.

Sarkar, et al., "Stretching the Rubber Sheet: A Metaphor for Viewing Large Layouts on Small Screens", Retrieved at <<http://reference.kfupm.edu.sa/content/s/t/stretching_the_rubber_sheet_a_metaphor_136229.pdf>>, In UIST '93: Proceedings of the 6th annual ACM symposium on User interface software and technology, Sep. 1993, pp. 13.

Quinn, et al., "Readability of Scanned Books in Digital Libraries", Retrieved at <<http://aq.gs/papers/Readability%20of%20scanned%20books%20in%20digital%20libraries%20(2008).pdf>>, Proceeding of the twenty-sixth annual SIGCHI conference on Human factors in computing systems, Apr. 5-10, 2008, pp. 10.

Gutwin, et al., "Interacting with Big Interfaces on Small Screens: a Comparison of Fisheye, Zoom, and Panning Techniques", Retrieved at <<http://www.idelix.com/pdf/usability/bigui-gi04.pdf>>, Proceedings of Graphics Interface 2004, May 17-19, 2004, pp. 8.

"International Search Report", Mailed Date: Jan. 24, 2011, Application No. PCT/US2010/038817, Filed Date: Jun. 16, 2010, pp. 9.

"Foreign Office Action", Chinese Application No. 201080027278.8, (Aug. 22, 2012), 8 pages.

"Foreign Office Action", Chinese Application No. 201080027278.8, (Nov. 5, 2012), 9 pages.

"Supplementary European Search Report", European Patent Application No. 10790115.9, (Feb. 18, 2013), 4 pages.

Chen, et al., "Navigation Techniques for Dual-Display E-Book Readers", *Proceedings of the SIGCHI Conference on Human Factors in Computing Systems*, (Apr. 5, 2008), 10 pages.

Buchanan, et al., "Improving Skim Reading for Document Triage", *Proceedings of the second international symposium on Information interaction in context*, (Oct. 2008), pp. 83-88.

Holzman, T.G. "Page Flipping for User Interfaces", *IBM Technical Disclosure Bulletin* vol. 36 No. 08, (Aug. 1, 1993), 6 pages.

"Foreign Office Action", European Patent Application No. 10790115.9, (Mar. 11, 2013), 6 pages.

* cited by examiner

INTEGRATING DIGITAL BOOK AND ZOOM INTERFACE DISPLAYS

BACKGROUND

As technology has advanced, the computational power of computers has increased while the size of computers has decreased. This has led to the use of computers in a wider range of fields and environments. One such use for computers is as a replacement for traditional paper-based books. Rather than having the text and illustrations of a book printed on paper, computers allow such text and illustrations to be stored digitally and displayed on a screen of the computer. Such current uses for computers, however, are not without their problems. One such problem is that current user interfaces for books can be cumbersome and non-intuitive, which can result in user frustration when using computers for reading books.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, different pages of a digital book are displayed in each of two display areas of a device using a book display model. In response to a request to see more context, the digital book is displayed in a broader context, the broader context using a context display model rather than the book display model. Additionally, in response to a request to see less context, the digital book is displayed in the book display model rather than the context display model.

In accordance with one or more aspects, a first page of a digital book is displayed in a first display area and a second page of the digital book is displayed in a second display area. A first request to see more context is received, and in response to the first request both the first page of the digital book and a context of the first page are displayed in the first display area, and both the second page of the digital book and a context of the second page are displayed in the second display area. After receiving the first request, a second request to see more context is received. In response to the second request, the digital book is displayed in the first display area, and multiple additional digital books are displayed in the second display area.

BRIEF DESCRIPTION OF THE DRAWINGS

The same numbers are used throughout the drawings to reference like features.

DETAILED DESCRIPTION

Integrating digital book and zoom interface displays is discussed herein. Two display areas are used to display information regarding one or more digital books. The information can be displayed using different models, including a book display model and a context display model. In the book display model, pages of the digital book are displayed in the two display areas, allowing the user to read the pages of the book analogous to a paper book. In the context display model, the pages of the digital book and/or an image of the digital book are displayed in context. This context can be additional pages of the digital book and/or other digital books associated with the digital book.

Multiple different levels of context information can be displayed in the context display model. Higher levels of context information provide broader context (e.g., additional digital books), while lower levels of context information provide narrower contexts (e.g., fewer digital books). The user can input requests to semantically zoom out, which are requests to display the information being displayed in a broader context. The semantic zoom out requests result in the information being displayed transitioning from the book display model through increasingly higher levels of the context display model. The user can also input requests to semantically zoom in, which are requests to display the information being displayed in a narrower context. The semantic zoom in requests result in the information being displayed transitioning from one level of the context display model to increasingly lower levels of the context display model or to the book display model.

Figure 1:
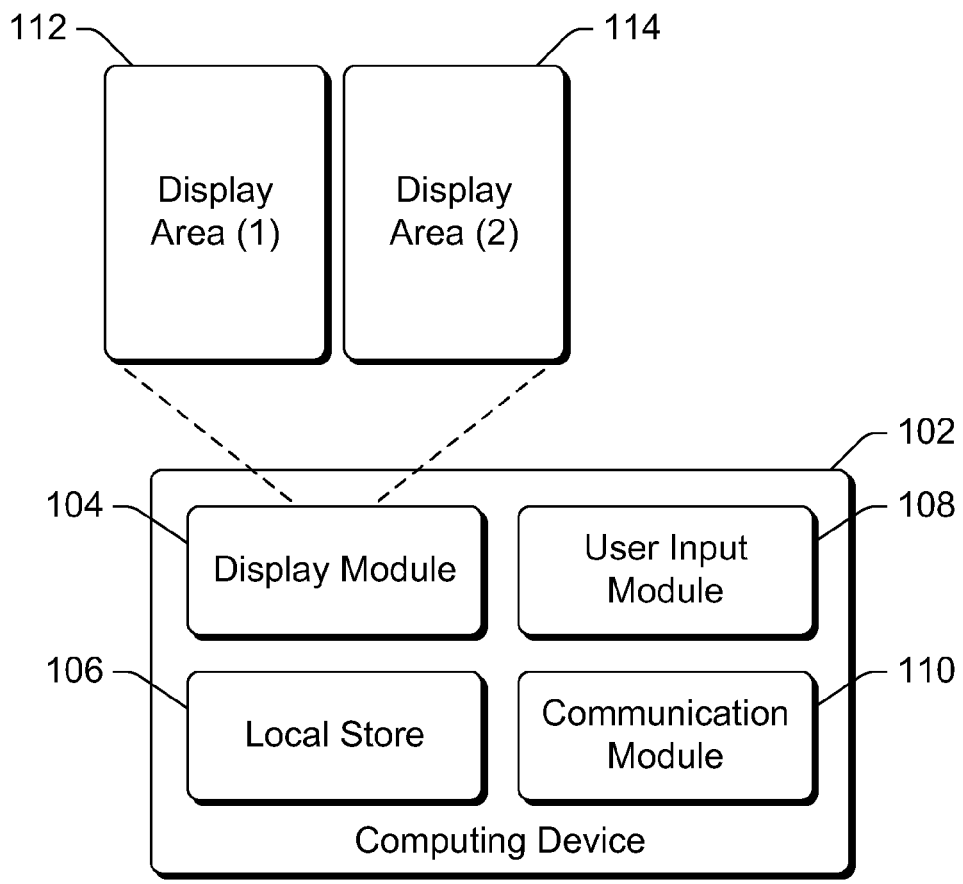
FIG. 1 illustrates an example system implementing the integrating digital book and zoom interface displays in accordance with one or more embodiments.

FIG. 1 illustrates an example system 100 implementing the integrating digital book and zoom interface displays in accordance with one or more embodiments. Computing device 102 can be a variety of different devices capable of generating displays for digital books. For example, computing device 102 can be a digital notepad, a dedicated digital book display device, a desktop computer, a mobile station, a netbook, an entertainment appliance, a set-top box communicatively coupled to a display device, a cellular or wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Computing device 102 includes a display module 104, a local store 106, a user input module 108, and a communication module 110. Computing device 102 can obtain, store, and generate displays for digital books. A digital book refers to a set of one or more pages that are stored and can be displayed electronically. A digital book can take a variety of different forms. For example, a digital book can be an electronic version of a novel, textbook, or other traditional paper-based book. By way of another example, a digital book can be an electronic version of a magazine, brochure, pamphlet, notebook, and so forth. Computing device 102 can optionally allow a user to input data to be saved as part of the digital book, such as user notes added to a notebook. A corresponding paper-based version of a digital book may exist, or alternatively a digital book may have no such corresponding paper-based version.

Local store 106 provides local storage of digital books. Local store 106 can be implemented in a variety of different manners, such as using a magnetic disk, an optical disc, solid state devices (e.g., Flash memory), combinations thereof, and so forth. Local store 106 can be implemented as a fixed storage device that is part of computing device 102, or alternatively can be implemented as a removable storage device that is coupled to computing device 102. A removable storage device can be coupled to computing device 102 using a variety of different techniques, such as a Universal Serial Bus (USB) connection, a Wireless USB connection, an IEEE 1394 connection, an infrared connection, and so forth.

Communication module 110 manages communication with one or more remote services or devices. Communication module 110 allows additional digital books or information regarding digital books (e.g., author, publication date, genre, image of the cover of the digital book, and so forth) to be retrieved from a remote service or device. The digital books or information regarding digital books obtained by communication module 110 can be stored in local store 106. Communication module 110 can communicate with the remote services or devices in a variety of different manners, such as via the Internet, a local area network (LAN), a public telephone network, an intranet, other public and/or proprietary networks, combinations thereof, and so forth. Communication module 110 can also communicate with local services or devices, such as via a Wireless USB connection, an infrared connection, and so forth.

User input module 102 allows user inputs or requests to be received by computing device 102. User input module 102 can support a variety of different input techniques, such as the selection of one or more physical buttons or keys of device 102, selection of one or more buttons displayed via a screen of device 102 (e.g., selected via a touchscreen), a particular input via a touchscreen (or touchpad) of device 102 (e.g., a single tap of the touchscreen, tapping the touchscreen twice in quick succession, inputting a particular symbol such as an "X" on the touchscreen, etc.), a particular physical feedback input to the device (e.g., tapping any portion of device 102 or another action that can be recognized by a motion detection component of device 102, such as shaking a device, rotating a device having a gyroscope, etc.), voice commands, and so forth.

Display module 104 manages the display of digital books using both a book display model and a context display model. Computing device 102 can include display components via which digital books are displayed, or alternatively computing device 102 can output a signal to one or more other components or devices which in turn can display the digital books. The digital books can be displayed on any type of television, monitor, liquid crystal display (LCD), projector, or other display system that renders image data.

The digital books are displayed using two display areas 112 and 114. In one or more embodiments, display areas 112 and 114 are each a separate display component. For example, display areas 112 and 114 can each be a separate LCD screen. In other embodiments, display areas 112 and 114 are separate portions of a single display component. For example, display areas 112 and 114 can each be a separate window on a single LCD screen. Display module 104 is aware of the two display areas 112 and 114, and generates content displays for each area 112 and 114. The specific content displayed in each area 112 and 114 can vary based on user inputs as discussed in more detail below. However, as there are two display areas 112 and 114, it is to be appreciated that different content can be displayed in the two display areas 112 and 114 concurrently. Using the book display model and context display model as discussed in more detail below, display module 104 can tailor the display of the digital book, pages of the digital book, and/or context of the digital book to using the two displays.

Although two display areas 112 and 114 are shown in FIG. 1, it is to be appreciated that additional display areas can alternatively be used. Such additional areas can allow additional pages of a digital book to be displayed, and or additional context information to be displayed.

For a given digital book, information can be displayed using different models. These different models include a book display model and a context display model. In the book display model, individual pages of the digital book are displayed in display areas 112 and 114, with different pages typically being concurrently displayed in areas 112 and 114. The user can input requests to magnify (or de-magnify) a display area 112 and/or 114, allowing the user to more easily view a portion of a page of the digital book. The user can also input requests to change which pages of the digital book are displayed in areas 112 and 114, allowing the user to turn or flip through the pages of the digital book analogous to a paper book.

In the context display model, the book and/or a portion of the digital book are displayed with different contexts. This context refers to different portions of the digital book (e.g., pages) and/or other books that are related to the digital book. Different contexts for the book and/or a portion of the book can be displayed, resulting in different context levels. For example, each display area 112 and 114 can display a different page of the book as well as the context of the displayed page, such as additional pages or chapters of the book. By way of another example, an image of the book can be displayed in display area 112 with the context of the book (e.g., other books available to the user) being displayed in display area 114. Multiple different levels of context information can be displayed in the context display model as discussed in more detail below.

The user can also input requests to semantically zoom out, resulting in the information being displayed transitioning from the book display model through different levels of the context display model. Semantically zooming out refers to displaying the information from the previous display with additional context. As the user semantically zooms out through context levels, the next context level displays the information that was displayed in the previous context level in a broader context (e.g., with additional digital books). The user can also input requests to semantically zoom in, resulting in the information being displayed transitioning from one level of the context display model to other levels of the context display model or to the book display model. Semantically zooming in refers to displaying information about the previous context level in a narrower context. As the user semantically zooms in through context levels, the next context level displays at least part of the information that was displayed in the previous context level in a narrower context (e.g., with fewer digital books). This semantic zooming in and out is discussed in more detail below.

FIGS. 2-10 show example user interface displays using two display areas in accordance with one or more embodiments. These user interface displays can be displayed, for example, in display areas 112 and 114 of FIG. 1, and user inputs can be received, for example, via user input module 108 of FIG. 1. Different displays in the book display model as well as the context display model are shown. Additionally, multiple context levels for the context display model are also shown. It is to be appreciated that the example user interface displays shown in FIGS. 2-10 are examples, and that a variety of different user interfaces can be displayed in accordance with the integrating digital book and zoom interface displays discussed herein.

In the discussions of FIGS. 2-10, various changes in user interface displays are discussed in response to user inputs. A user can indicate such inputs in a variety of different manners as discussed above. Additionally, different inputs can be used to signify different user requests. For example, one key sequence or other action can be used to request a book be turned to next page, another key sequence or other action can be used to request semantic zooming out, yet another key sequence or action can be used to request semantic zooming in, and so forth.

Figure 2:
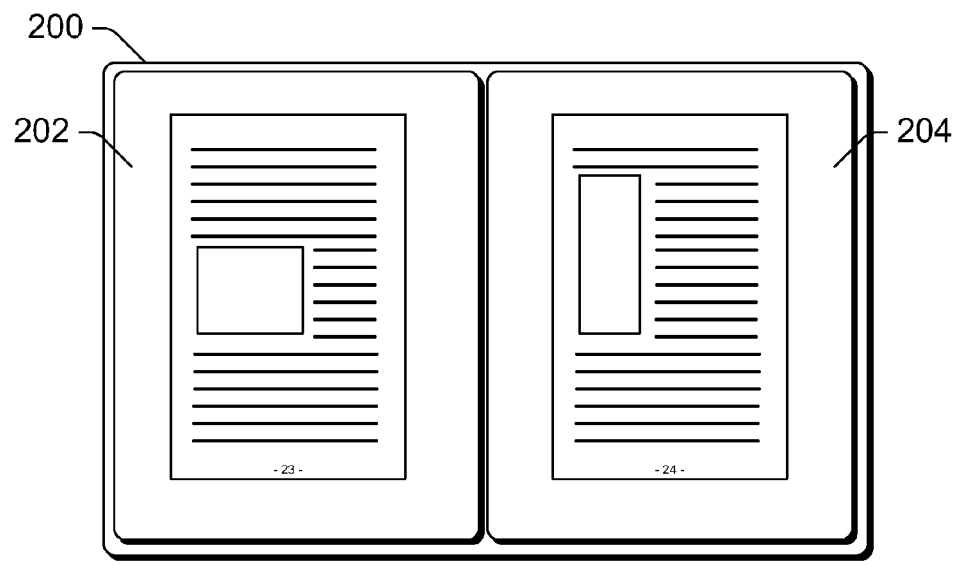
FIG. 2 shows an example user interface display having two display areas displaying the digital book using the book display model in accordance with one or more embodiments.

FIG. 2 shows a user interface display 200 having a first display area 202 and a second display area 204. User interface display 200 displays two pages of a digital book using the book display model. One page of the digital book is displayed in area 202 while another page of the book is displayed in area 204. This digital book is also referred to as the focus digital book as it is deemed to be the current focus of the user's attention.

Figure 3:
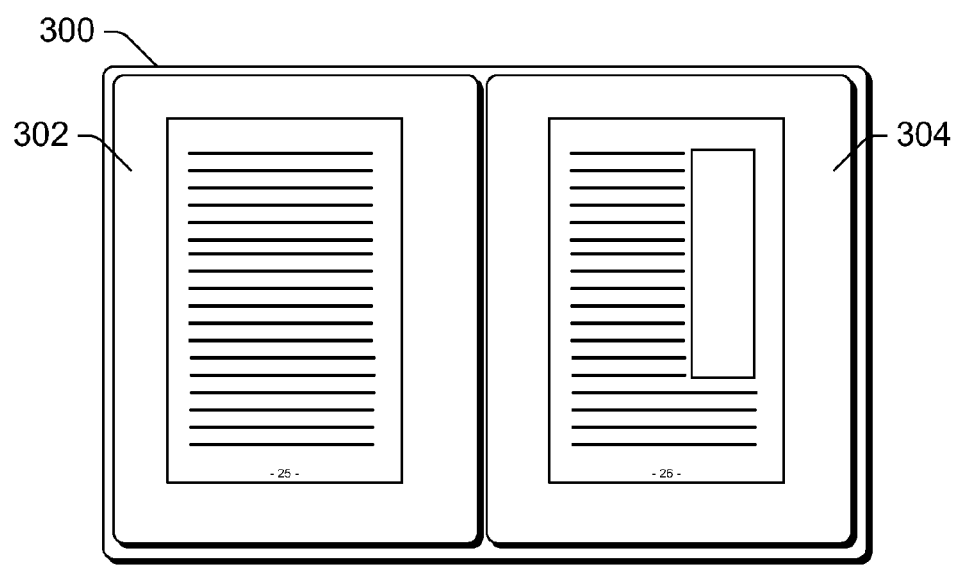
FIG. 3 shows another example user interface display having two display areas displaying the digital book using the book display model in accordance with one or more embodiments.

FIG. 3 shows a user interface display 300 having a first display area 302 and a second display area 304. User interface display 300 also displays two pages of a digital book using the book display model. However, user interface display 300 differs from user interface display 200 by showing that the user has navigated through the digital book by turning a page. Accordingly, as can be seen from user interface displays 200 and 300, using the book display model different pages of the book can be displayed concurrently side-by-side in the two display areas. This concurrent side-by-side display provides a look and feel for the digital book that is analogous to the look and feel of a paper book. Additionally, although not illustrated in FIGS. 2 and 3, a user can magnify one or both of the pages of the digital book.

Figure 4:
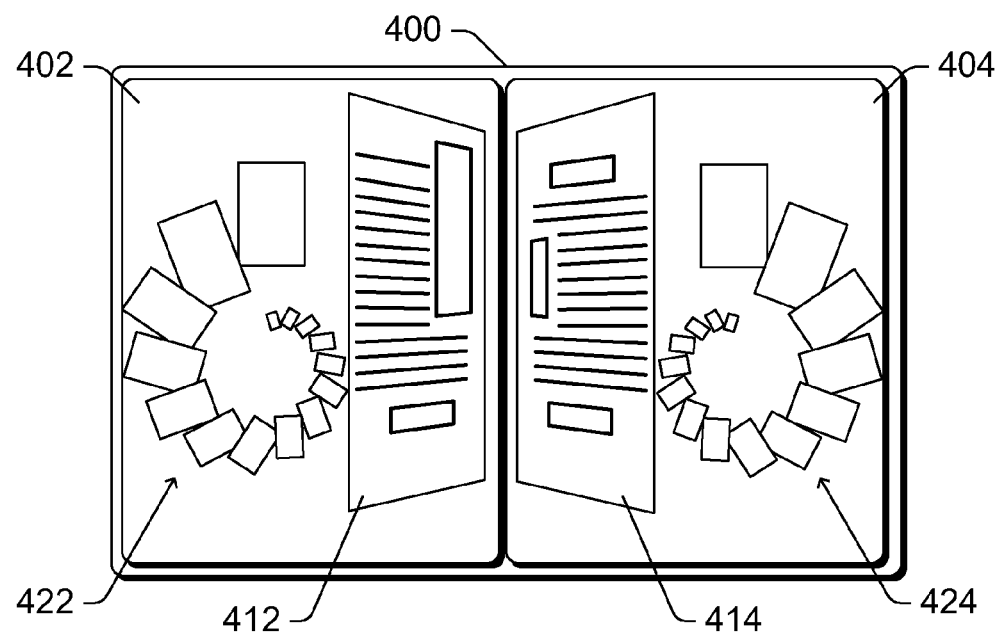
FIG. 4 shows an example user interface display having two display areas displaying the digital book using the context display model in accordance with one or more embodiments.

FIG. 4 shows a user interface display 400 having a first display area 402 and a second display area 404. User interface display 400 is displayed in response to a user request to semantically zoom out from the book display model. User interface display 400 displays two pages of the focus digital book using the context display model. One page 412 of the book is displayed in display area 402 along with the context of that one page 412, while an additional page 414 of the book is displayed in display area 404 along with the context of that additional page 414.

In the illustrated example display 400, context 422 is displayed for page 412. As page 412 is the left-hand page of the two pages being displayed in areas 402 and 404, the context 422 is multiple pages preceding page 412 in the digital book. The preceding pages can be identified by selecting pages one by one going backwards in the book from page 412, or alternatively page jumps can be made. For example, if page 412 is page number 487 of the digital book, then context 422 can be page numbers 486, 485, 484, 483, 482, 481, and so forth. By way of another example, if page 412 is page number 487 of the digital book, then context 422 can be page numbers 486, 485, 484, 480, 470, 450, and so forth. These jumps can be a particular number of pages that are skipped, jumps to preceding chapter heading pages, and so forth.

Similarly, context 424 is displayed for page 414. As page 414 is the right-hand page of the two pages being displayed in areas 402 and 404, the context 424 is multiple pages following page 414 in the digital book. The following pages can be identified by selecting pages one by one going forwards in the book from page 414, or alternatively page jumps can be made. For example, if page 414 is page number 488 of the digital book, then context 424 can be page numbers 489, 490, 491, 492, 493, 494, and so forth. By way of another example, if page 414 is page number 488 of the digital book, then context 424 can be page numbers 489, 490, 491, 492, 495, 500, 510, and so forth. These jumps can be a particular number of pages that are skipped, jumps to succeeding chapter heading pages, and so forth.

In display 400, context 422 and context 424 are both shown with pages in a particular pattern (e.g., a spiral). It is to be appreciated that the pattern of the pages in contexts 422 and 424 can vary and that other patterns can alternatively be used. Additionally, the pattern used for the pages in context 422 can be different than the pattern used for the pages in context 424. For example, pages in context 422 and/or context 424 can be arranged in a list, a grid, triangular or other geometric shapes, and so forth.

As can be seen from display 400, in response to the user request to semantically zoom out from the book display model illustrated in FIGS. 2 and 3, the pages of the digital book are displayed in the display areas in context. This context for the pages provides an indication to the user of the context of those pages within the digital book. Thus, rather than simply scaling the pages of the digital book to a different size, the semantic zooming provides context for the pages of the digital book.

The user can input requests for a variety of different actions via user interface display 400. The user can input a request to semantically zoom in, which returns to user interface display 200 of FIG. 2 being displayed. The user can input a request to semantically zoom out, which results in user interface display 500 of FIG. 5 being displayed, as discussed in more detail below. The user can input a request to enter a scratchpad mode, as discussed in more detail below. The user can also select a particular page in context 422 or context 424. In response to a selection of a page in context 422 or 424, user interface display 200 of FIG. 2 is displayed with the selected page being one of the pages in display area 202 and 204 of FIG. 2, and the preceding or succeeding page (if any) being the page displayed in the other of display area 202 and 204. Which display area 202 or 204 the selected page is displayed in can be determined in a variety of different manners (e.g., the selected page is displayed in display area 202 if selected from context 422, and in display area 204 if selected from context 424).

Figure 5:
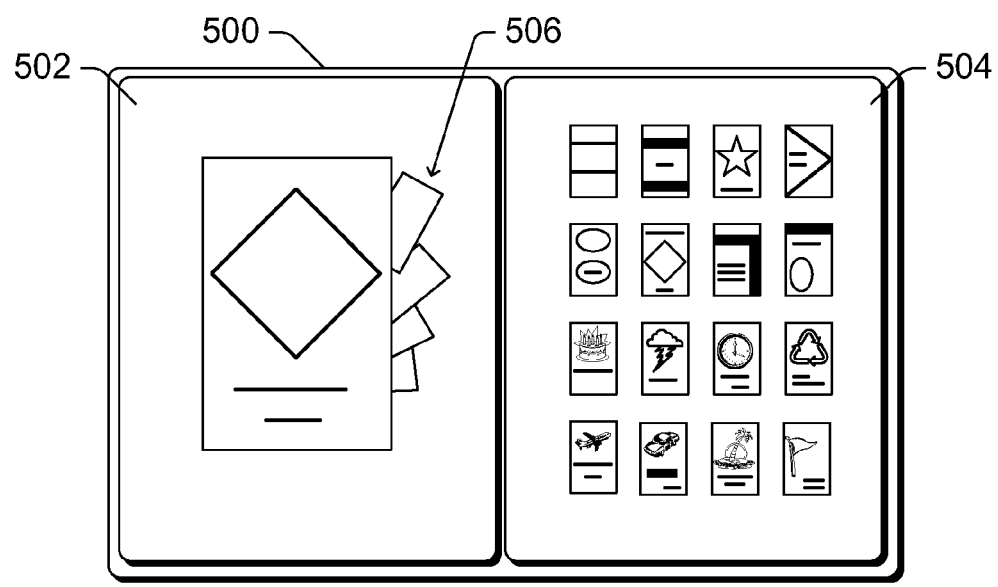
FIG. 5 shows another example user interface display having two display areas displaying the digital book using the context display model in accordance with one or more embodiments.

FIG. 5 shows a user interface display 500 having a first display area 502 and a second display area 504. User interface display 500 is displayed in response to a user request to semantically zoom out from the user interface display 400 of FIG. 4. User interface display 500 provides a broader context or more context than user interface display 400 of FIG. 4. User interface display 500 displays the focus digital book using the context display model. An image of the digital book is displayed in display area 502, while images of one or more other digital books are displayed in display area 504. In one or more embodiments, the image of a digital book is the cover or cover page of the digital book. Alternatively, other images of the digital book can be obtained (e.g., from a publisher and/or author of the digital book). Displaying an image of a digital book can also be referred to as displaying the digital book.

The digital books displayed in display area 504 provide a broader context for the digital book displayed in display area 502. The digital books displayed in display area 504 are based at least in part on the focus digital book displayed in display area 502, and can be identified based on a variety of different criteria. These criteria can include criteria based on a user or owner of the focus digital book (e.g., the individual or entity that purchased or otherwise acquired the right to view the focus digital book). This user or owner can be the owner of the device displaying the digital book (e.g., device 102 of FIG. 1), or alternatively another individual or entity. For example, the digital books in display area 504 can be digital books that are in a local library of a user of the focus digital book, can be digital books on a list of favorite books of a user of the focus digital book, can be digital books on a list of recommended digital books or digital books to read of the user of the focus digital book, can be digital books in a same genre or with a same author as the focus digital book, and so forth.

Additionally, the user can request that particular criteria be used in identifying the digital books to be displayed in display area 504. The user can make this request as a configuration or preferences setting that is used each time digital books are selected for display in display area 504. Alternatively, the user can input a request while display 500 is being displayed, the request identifying the particular criteria to be used. For example, display area 504 can initially display digital books that are on a list of digital books to read of the user of the focus digital book, and the user can input a request to have the digital books in display area 504 be digital books having a same author as the focus digital book. In response to such a request while display 500 is being displayed, a different set of digital books that satisfy the new criteria are identified and displayed in display area 504.

Additionally, the digital books displayed in display area 504 can be arranged in a variety of different manners based on a variety of different criteria. For example, the digital books can be arranged alphabetically by author or title, according to a rating assigned by the owner of the focus digital book or by some other entity, according to a publishing date, according to digital books most recently read by the user, and so forth. The user can also request that different criteria be used in arranging the digital books displayed in display area 504. The user can make this request as a configuration or preferences setting that is used each time digital books are displayed in display area 504. Alternatively, the user can input a request while display 500 is being displayed, the request identifying the criteria to be used. For example, display area 504 can initially display digital books alphabetically by author, and the user can input a request to have the digital books in display area 504 be displayed according to how recently they were read by the user. In response to such a request while display 500 is being displayed, the display of the digital books in display area 504 is changed to satisfy the new criteria.

Furthermore, some digital books in display area 504 can also be displayed more prominently, such as being displayed larger, with different border, in different colors, and so forth. The digital books in display area 504 to be displayed more prominently can be selected in a variety of different manners, such as based on the author of the digital book, the genre of the digital book, the cost of the digital book, and so forth.

The digital book displayed in display area 502 is also displayed with one or more pages 506 of the book behind the cover. These one or more pages 506 are displayed to help differentiate the focus digital book from the other books in display area 504. These one or more pages 506 can be used to allow the user to readily identify that the book displayed in area 502 is the book the user was viewing before semantically zooming out.

The user can input requests for a variety of different actions via user interface display 500. The user can input a request to semantically zoom in, which returns to user interface display 400 of FIG. 4 being displayed. The user can input a request to semantically zoom out, which results in user interface display 600 of FIG. 6 being displayed, as discussed in more detail below. The user can input a request to enter a scratchpad mode, as discussed in more detail below. The user can also select a particular book in display area 502 or display area 504. In response to a selection of a book in display area 502 or display area 504, user interface display 200 of FIG. 2 is displayed with the cover of the selected book being one of the pages in display areas 202 and 204 of FIG. 2. The particular display area 202 or 204 in which the cover of the selected book is displayed can be determined in a variety of different manners (e.g., the device displaying user interface display 200 of FIG. 2 can be configured to display the cover in display area 202 and the next page of the book in display area 204).

Alternatively, rather than displaying the cover of the selected book, a different page of the selected book can be displayed in display area 202 or 204 of FIG. 2. The particular page displayed can be determined in different manners, such as being a page selected by an author or publisher of the selected book, being a page selected randomly, being a page selected according to other rules criteria, and so forth. In one or more embodiments, the device displaying user interface display 200 of FIG. 2 can maintain a record, for each digital book opened by a user of the device, a most recently displayed page of the digital book. In such embodiments, the particular page of the selected digital book that is displayed in display area 202 or 204 of FIG. 2 is this most recently displayed page of the selected digital book.

Figure 6:
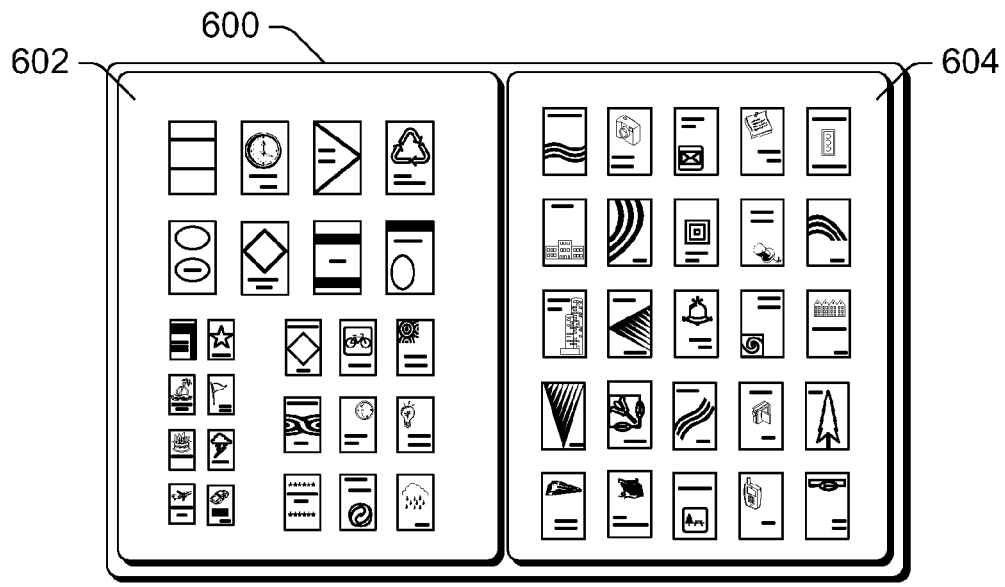
FIG. 6 shows another example user interface display having two display areas displaying the digital book using the context display model in accordance with one or more embodiments.

FIG. 6 shows a user interface display 600 having a first display area 602 and a second display area 604. User interface display 600 is displayed in response to a user request to semantically zoom out from the user interface display 500 of FIG. 5. User interface display 600 provides more or broader context than user interface display 500 of FIG. 5.

User interface display 600 displays the focus digital book using the context display model. An image of the focus digital book (which was displayed in display area 502 of FIG. 5) is displayed in display area 602 along with images of one or more other digital books. Additional images of yet other digital books are displayed in display area 604.

Display area 602 displays the digital books that were previously displayed in display areas 502 and 504 of FIG. 5. An additional set of one or more books is also selected for display in display area 604. A variety of different criteria can be used to select the books for display in area 604. In one or more embodiments, a broader source of books is used for the selection of books in area 604 but otherwise the same criteria are used as were used for selecting books for display in display area 504 of FIG. 5 (which are now included in display area 602 of FIG. 6). For example, the criteria used to select the books in area 602 and 604 can both be books having the same author as the focus digital book, but the books in area 602 can be the books available to the owner of the focus digital book locally while the books in area 604 can be the books available to the owner of the focus digital book from a remote library. Alternatively, different criteria can be used to select the books for display in area 604 than is used to select the books for display in area 602.

Additionally, a user can request to change the criteria used to select the books in display area 602, analogous to the discussions above regarding FIG. 5. In one or more embodiments, when the user requests to change the criteria used to select the books in display area 602, the same change is imposed on the books displayed in display area 604. However, the books in display area 604 continue to be drawn from a broader source than those in display area 602. Alternatively, the user can request to change the criteria used to select the books for display in display area 602 and the books for display in display area 604 independently.

The books displayed in display area 602 can be arranged in a variety of different manners, analogous to the discussion above regarding FIG. 5. The user can also request that different criteria be used in arranging the digital books displayed in display area 602, analogous to the discussion above regarding FIG. 5. For example, the books in display area 602 can be arranged alphabetically by author or title, according to a rating assigned by the owner of the focus digital book or by some other entity, according to a publishing date, according to books most recently read by the user, and so forth. Some digital books can be displayed more prominently, such as being displayed larger as illustrated in the top portion of display area 602. The books to be displayed more prominently can be selected in a variety of different manners, such as the author of the book, the genre of the book, the cost of the book, and so forth.

Similarly, the books displayed in display area 604 can also be arranged in a variety of different manners, and the user can request that certain criteria be used in arranging the digital books displayed in display area 604. For example, the books in display area 604 can be arranged in any of the same manners as the books in display area 602 as discussed above. The books in display area 604 can be arranged in the same manner as the books in display area 602 or alternatively in a different manner. For example, the books in both display areas 602 and 604 can be arranged according to author, or alternatively the books in display area 602 can be arranged according to author while the books in display area 604 are arranged according to an assigned rating.

The user can input requests for a variety of different actions via user interface display 600. The user can input a request to semantically zoom in, which returns to user interface display 500 of FIG. 5 being displayed. The user can input a request to semantically zoom out, which results in the focus digital book being displayed in an even broader context (such as from an additional source or sources of books). The user can input a request to enter a scratchpad mode, as discussed in more detail below. The user can also select a particular book in display area 602 or display area 604. In response to a selection of a book in display area 602 or display area 604, user interface display 200 of FIG. 2 is displayed with the cover (or other page) of the selected book being one of the pages in display area 202 and 204 of FIG. 2, analogous to the discussion above regarding FIG. 5.

Thus, as can be seen from the example displays in FIGS. 4-6, increasingly broader context is displayed as the user semantically zooms out. Each change in context level as the user semantically zooms out provides wider or broader context. Similarly, as the user semantically zooms in, increasingly narrower context is displayed. Each change in context level as the user semantically zooms in provides more specific or narrower context.

Figure 7:
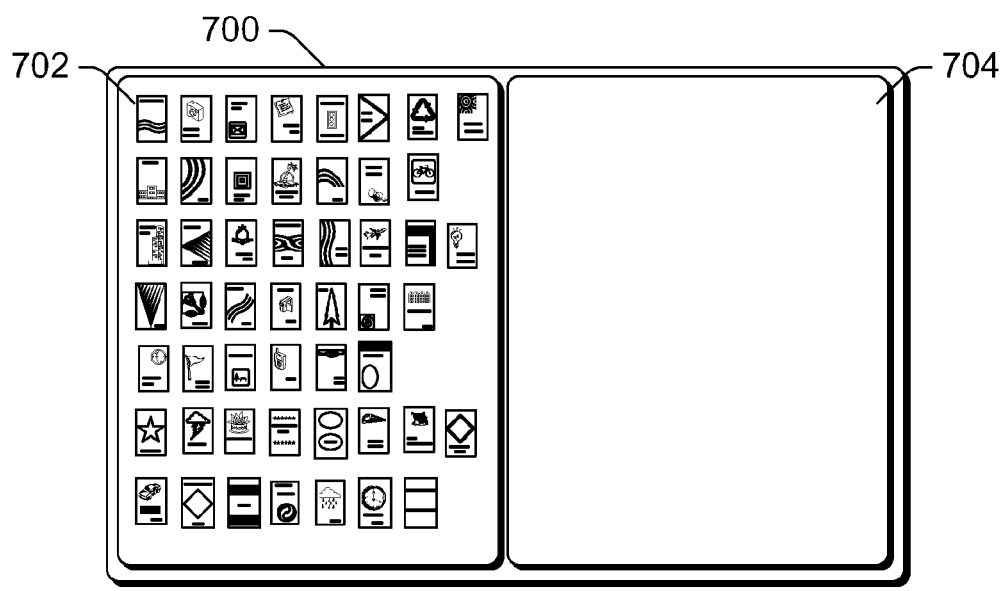
FIG. 7 shows an example user interface display having two display areas displaying a scratchpad mode in accordance with one or more embodiments.

FIG. 7 shows a user interface display 700 having a first display area 702 and a second display area 704. User interface display 700 is displayed in response to a user request to enter a scratchpad mode. Such a request can be entered from a variety of different user interface displays as discussed above. In user interface display 700, the digital books (and/or pages) that were previously displayed in the two display areas are combined and displayed in display area 702. For example, the digital books displayed in areas 602 and 604 of FIG. 6 can be combined and displayed in display area 702. By way of another example, the pages displayed in display areas 402 and 404 of FIG. 4 can be combined and displayed in display area 702. The books displayed in display area 702 can be arranged in a variety of different manners analogous to the discussions above regarding arrangement of books in a display area regarding FIGS. 5 and 6.

Display area 704, on the other hand, is empty. When the scratchpad mode is entered, no books are displayed in display area 704. However, books can be added to display area 704 as discussed in more detail below. Alternatively, a state of display area 704 can be maintained by the device displaying the user interface display 700 when the scratchpad mode is exited. This state of display area 704 refers to books being displayed in display area 704, as well as optionally the arrangement of those books. When the scratchpad mode is subsequently reentered, this maintained state can be retrieved and the digital books identified in that state displayed in display area 704. Whether such a state is maintained is optionally a configuration setting that can be set by a user.

When the scratchpad mode is entered with no books being displayed in display area 704, user interface display 700 can provide the impression of creating workspace by cleaning off a portion of the display 700. For example, when transitioning from display 600 of FIG. 6 to display 700, the impression is given of pushing all the digital books from display areas 602 and 604 of FIG. 6 into a single area (display area 702), leaving a clean workspace in the form of display area 704. Alternatively, the digital books (and/or pages) that were previously displayed in the two display areas can be combined and displayed in display area 704, with no books being displayed in display area 702.

The user can then select digital books from display area 702 to be added to display area 704. The selection can be performed in a variety of different manners, such as the user dragging and dropping digital books from area 702 to area 704, the user tapping or double-tapping digital books in area 702 to have them added to area 704, and so forth. The books displayed in display area 702 can also be changed in response to user requests, with the user requesting particular criteria analogous to the discussions above.

The user can also input a request to return to the user interface display that was being displayed when the request to enter the scratchpad mode was received. The user can thus return to whatever user interface display he or she was using prior to entering the scratchpad mode. This user interface display that is returned to can be the book display model as discussed above or a level of the context display model as discussed above.

The user can also select a particular book in display area 702 or display area 704 (after books are added to display area 704). In response to a selection of a book in display area 702 or display area 704, user interface display 200 of FIG. 2 is displayed with the cover (or other page) of the selected book being one of the pages in display area 202 and 204 of FIG. 2, analogous to the discussion above regarding FIG. 5.

Thus, in the scratchpad mode illustrated with user interface display 700, the user is able to generate a collection or grouping of books according to his or her desires. This collection or grouping of books can be arranged in a variety of different manners, analogous to the manners of arrangement discussed above. Alternatively, the arrangement can be user-specified on a per book basis. For example, the location of a book in display area 704 can be the location that the user dropped the book after dragging it from display area 702.

Figure 8:
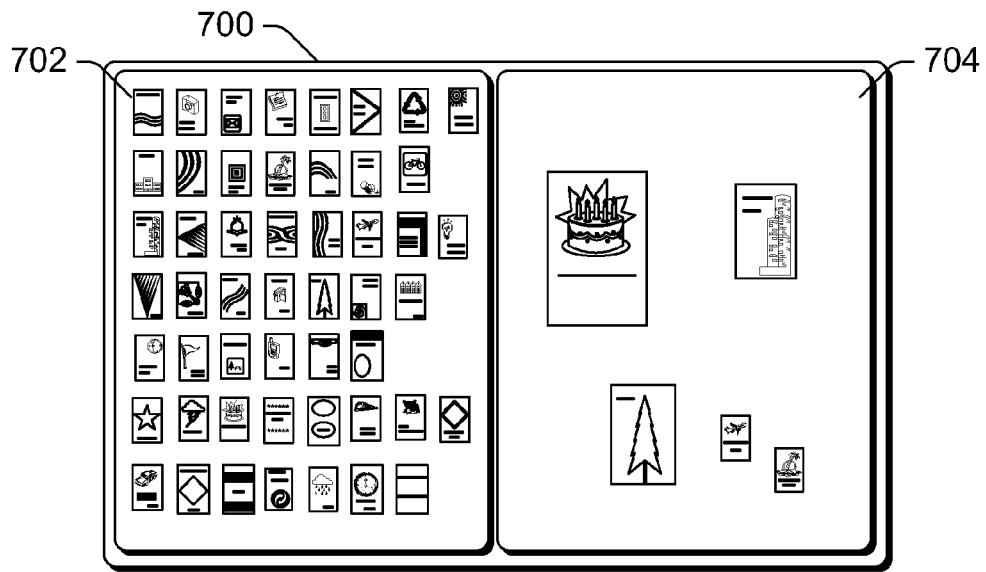
FIG. 8 shows another example user interface display having two display areas displaying a scratchpad mode in accordance with one or more embodiments.
Figure 9:
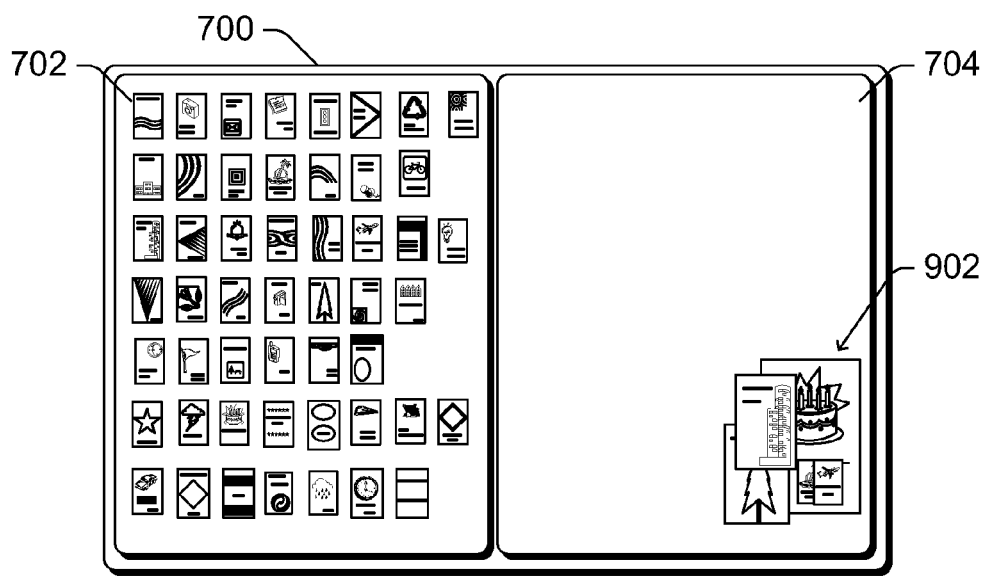
FIG. 9 shows another example user interface display having two display areas displaying a scratchpad mode in accordance with one or more embodiments.

FIGS. 8 and 9 illustrate different arrangements for the digital books displayed in display area 704. In FIG. 8, the digital books are displayed in display area 704 in the location where they were dropped by the user after having been dragged from display area 702. Particular books can be displayed more prominently than others, such as larger, based on a variety of different rules or criteria. For example, the books to be displayed more prominently can be selected in a variety of different manners, such as based on the author of the book, the genre of the book, the cost of the book, and so forth.

In FIG. 9, the digital books are also displayed in display area 704 in the location where they were dropped by the user after having been dragged from display area 702. However, in FIG. 9 the digital books are displayed as having been dropped in a pile in a corner of display area 704. Similar to FIG. 8, particular books can be displayed more prominently than others, such as larger, based on a variety of different rules or criteria.

A single pile 902 of digital books is illustrated in FIG. 9. Alternatively, multiple such piles can be displayed in display area 704. Multiple piles allows the user to generate multiple collections of digital books in accordance with his or her desires. For example, the user can have a collection of books that he or she has not read but wants to read, a collection of books that he or she has read but wants to re-read, and so forth.

Figure 10:
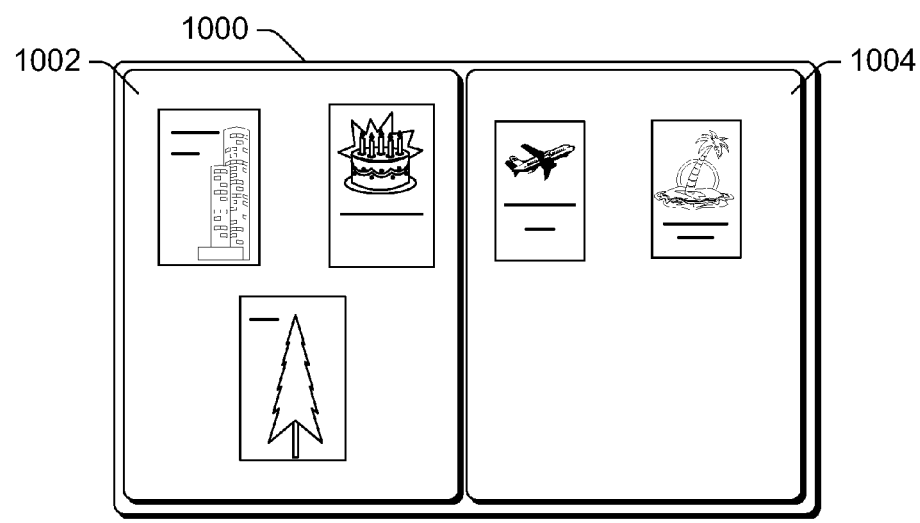
FIG. 10 shows another example user interface display having two display areas displaying the digital book using the context display model in accordance with one or more embodiments.

FIG. 10 shows a user interface display 1000 having a first display area 1002 and a second display area 1004. User interface display 1000 is displayed in response to a user request to explore a collection of books. Such a request can be entered, for example, by selecting a pile of books displayed in a scratchpad mode (e.g., pile 902 of FIG. 9), by requesting all the books in a display area (e.g., display area 704 of FIG. 8) be displayed across both display areas, and so forth. The collection of books can be arranged in a variety of different manners, analogous to the manners of arrangement discussed above.

The scratchpad mode illustrated in FIGS. 7-10 allows the user to easily select a collection of books. This collection of books can be used as a basis for the books displayed using the context display model discussed above. The criteria used to select books, or the arrangement of books, can be based on this collection of books. For example, the books displayed in display area 504 of FIG. 5 can be (or can at least include) the collection of books selected by the user from the scratchpad mode. By way of another example, the books displayed in display area 602 of FIG. 6 can be (or can at least include) the collection of books selected by the user from the scratchpad mode.

It should be noted that in the example of the scratchpad mode illustrated with reference to FIGS. 7-10 above, digital books are illustrated. Alternatively, rather than different digital books, the scratchpad mode can be used analogously for different pages of a digital book. For example, in FIG. 9, pages of a digital book can be displayed in display area 702, and a collection of pages in a pile in a corner of display area 704 can be created.

Figure 11:
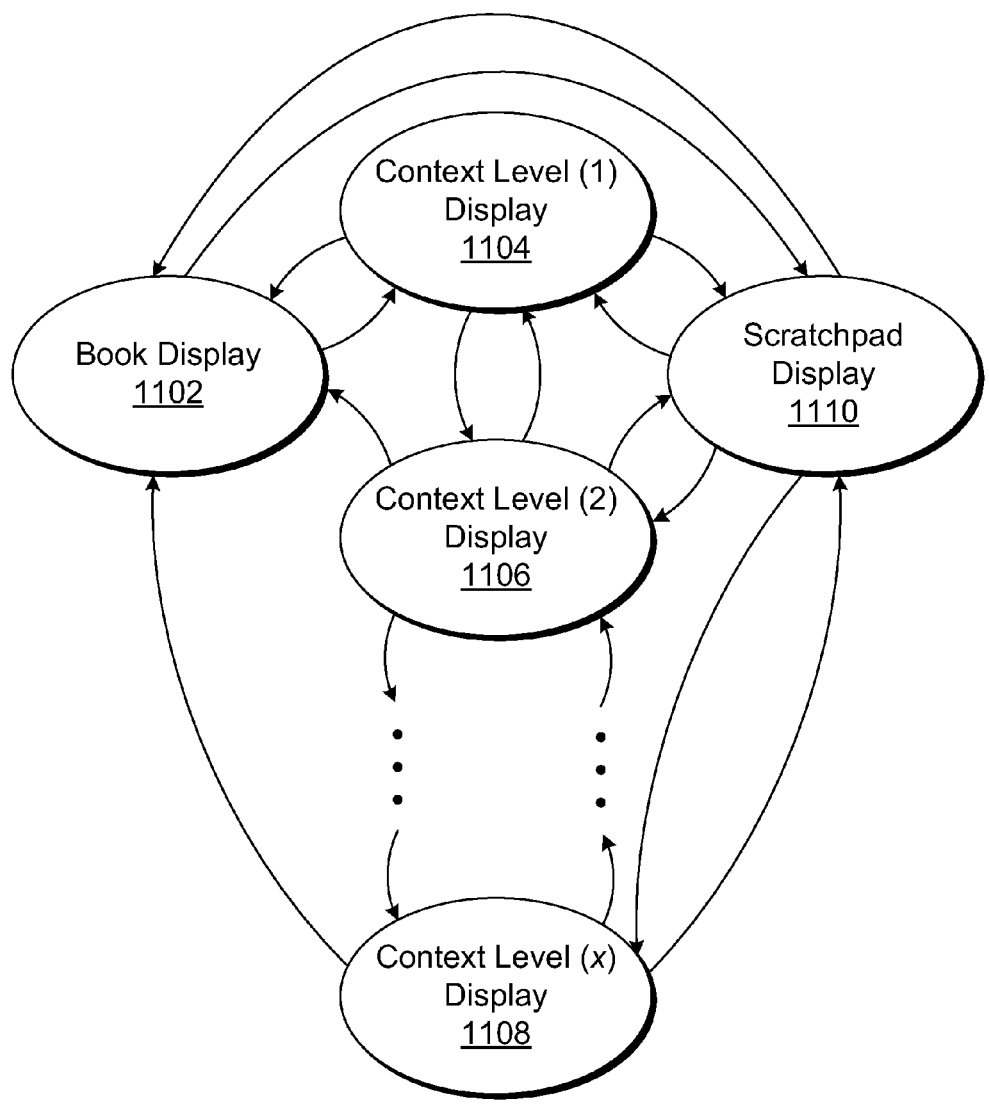
FIG. 11 illustrates an example state diagram showing example transitions between the digital book and zoom interface displays in accordance with one or more embodiments.

FIG. 11 illustrates an example state diagram 1100 showing example transitions between the digital book and zoom interface displays in accordance with one or more embodiments. State diagram 1100 illustrates an example of different user interface displays that can be displayed using the integrating digital book and zoom interface displays in accordance with one or more embodiments. These user interface displays are displayed in accordance with a book display model, a context display model, and a scratchpad mode as discussed above.

State diagram 1100 includes a book display state 1102, a scratchpad display state 1110, and multiple (x) context level display states 1104, 1106, and 1108. Transitions to different states are made in response to requests received by the device displaying the user interface displays. These requests are typically user requests, but alternatively can be received from other components, modules, or devices.

In book display state 1102, one or more pages of a digital book are displayed using a book display model. For example, user interface display 200 of FIG. 2 or user interface display 300 of FIG. 3 can be displayed in book display state 1102.

In context level display states 1104, 1106, and 1108, one or more pages of the digital book and/or other digital books are displayed using a context display model. For example, user interface display 400 of FIG. 4 can be displayed in context level display state 1104, user interface display 500 of FIG. 5 can be displayed in context level display state 1106, and user interface display 600 of FIG. 6 can be displayed in context level display state 1108.

In scratchpad display state 1110, a user interface in a scratchpad mode is displayed. For example, in scratchpad display state 1110 a user interface display 700 of FIGS. 7, 8, or 9, or a user interface display 1000 of FIG. 10 can be displayed.

As shown in state diagram 1100, the display can transition from book display state 1102 to a first context level display state 1104 or to scratchpad display state 1110. From a context level display state 1104, 1106, or 1108, the display can transition to scratchpad display state 1110, book display state 1102, or to another context level display state. From a given context level display state, the display can transition to a higher context level display state (e.g., providing broader context) or to a lower context level display state (e.g., providing narrower context). Additionally, from scratchpad display state 1110, the display can transition to book display state 1102 or a context level display state 1104, 1106, or 1108.

In the example of FIG. 11, the display can transition from book display state 1102 to a first context level display state 1104, and then can transition to higher context level display states one state at a time. Alternatively, one or more context level display states can be jumped or skipped. For example, the display can transition from book display state 1102 to context level display state 1106 without having first transitioned to context level display state 1104. By way of another example, the display can transition from context level display state 1104 to context level display state 1108 without having first transitioned to context level display state 1106.

Figure 12:
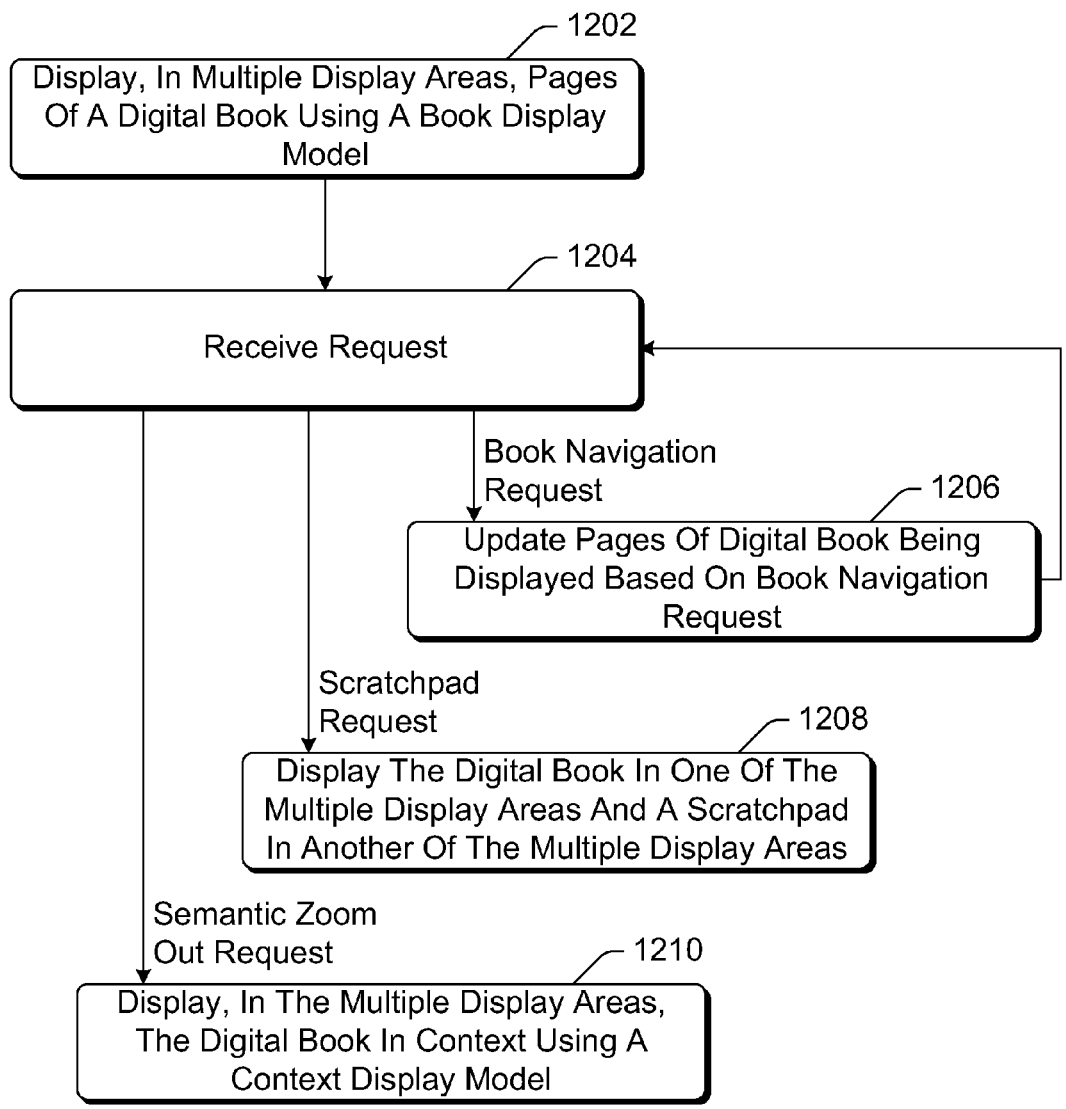
FIG. 12 is a flowchart illustrating an example process for a device implementing the integrating digital book and zoom interface displays in accordance with one or more embodiments.

FIG. 12 is a flowchart illustrating an example process 1200 for a device implementing the integrating digital book and zoom interface displays in accordance with one or more embodiments. Process 1200 is carried out by a device, such as computing device 102 of FIG. 1, and can be implemented in software, firmware, hardware, or combinations thereof. Process 1200 is an example process for implementing the integrating digital book and zoom interface displays; additional discussions of implementing the integrating digital book and zoom interface displays are included herein with reference to different figures. Process 1200 is an example process followed beginning with pages of the book being displayed in a book display model.

In process 1200, pages of the digital book are displayed in multiple display areas using a book display model (act 1202). When displaying pages of the digital book in the book display model, a request can be received (act 1204). Requests are typically received from a user, but alternatively can be received from other components, modules, or devices. A variety of different types of requests can be received. In the example of FIG. 12, these different types of requests include a book navigation request, a scratchpad request, and a semantic zoom out request.

In response to a book navigation request, the pages of the digital book being displayed are updated based on the request (act 1206). The updating of the page that is displayed can vary based on the particular navigation request received. For example, the navigation request can be a request to turn a page forward, resulting in the next two pages of the digital book being displayed. By way of another example, the navigation request can be a request to turn a page backwards, resulting in the previous two pages of the digital book being displayed. By way of yet another example, the navigation request can be a request to jump to a particular chapter of the digital book, resulting in the pages of the digital book beginning at that particular chapter being displayed. After updating the pages, process 1200 returns to wait for another request (act 1204).

In response to a scratchpad request, the pages of the digital book are displayed in one of the multiple display areas while a scratchpad is displayed in another of the multiple display areas (act 1208). The scratchpad allows the user to create one or more collections of books as discussed above. Additionally, subsequent requests can return process 1200 to displaying pages of the digital book using a book display model, or transition process 1200 to displaying the digital book in context using a context display model as discussed above.

In response to a semantic zoom out request, process 1200 transitions to displaying the digital book in the multiple display areas in context using a context display model (act 1210). The digital book can be displayed in various context level displays as discussed above. Subsequent requests can return process 1200 to displaying pages of the digital book using a book display model, semantically zooming in on the digital book, or displaying a scratchpad as discussed above.

Figure 13:
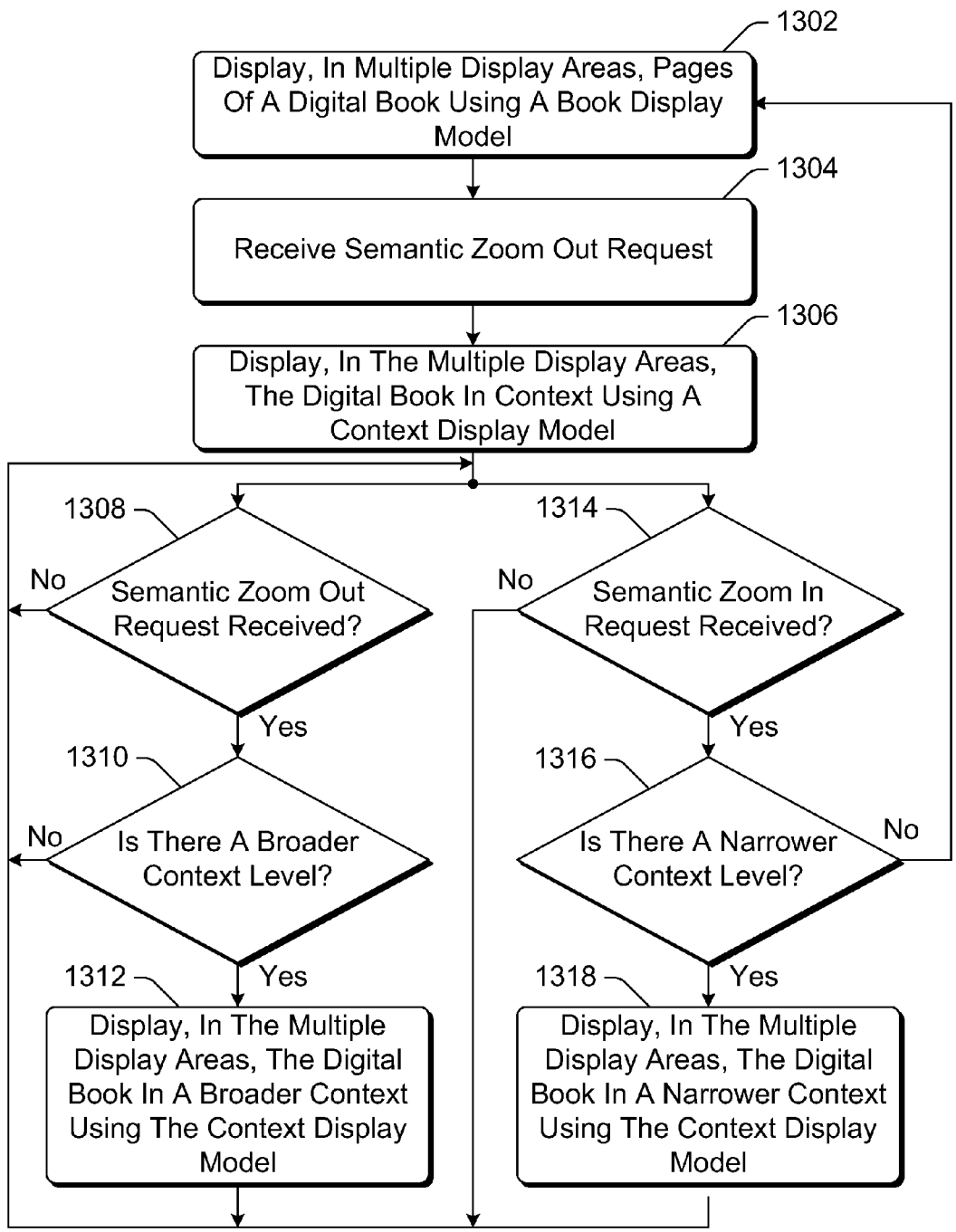
FIG. 13 is a flowchart illustrating an example process for a device implementing the integrating digital book and zoom interface displays in accordance with one or more embodiments.

FIG. 13 is a flowchart illustrating an example process 1300 for a device implementing the integrating digital book and zoom interface displays in accordance with one or more embodiments. Process 1300 is carried out by a device, such as computing device 102 of FIG. 1, and can be implemented in software, firmware, hardware, or combinations thereof. Process 1300 is an example process for implementing the integrating digital book and zoom interface displays; additional discussions of implementing the integrating digital book and zoom interface displays are included herein with reference to different figures. Process 1300 is an example process followed beginning with pages of the book being displayed in a book display model, and using semantic zooming.

In process 1300, pages of the digital book are displayed in multiple display areas using a book display model (act 1302). Act 1302 is analogous to act 1202 of FIG. 12. Process 1300 refers to requests for semantic zooming. It is to be appreciated that, although not illustrated in FIG. 13, book navigation requests and scratchpad requests can also be received as discussed above.

While displaying pages of the digital book using the book display model, a semantic zoom out request is received (act 1304). In response to the semantic zoom out request, the digital book is displayed in the multiple display areas in context using a context display model (act 1306). The digital book is displayed in act 1306 in the context display model rather than in the book display model.

Process 1300 continues to display the digital book in context using the context display model in act 1306 until a semantic zoom out or semantic zoom in request is received. If a semantic zoom out request is received (act 1308), then a check is made as to whether there is a broader context level to be displayed (act 1310). If there is no boarder context level that can be displayed, then process 1300 continues to display the digital book in context at the current context level until a semantic zoom in request is received.

However, if there is a broader context level that can be displayed, then the digital book is displayed in the multiple display areas in a broader context using the context display model (act 1312). For example, the display can transition to the next higher (broader) context level display in act 1312. Process 1300 continues to display the digital book in this new context level using the context display model in act 1312 until a semantic zoom out or semantic zoom in request is received.

If a semantic zoom in request is received (act 1314), then a check is made as to whether there is a narrower context level to be displayed (act 1316). If there is no narrower context level that can be displayed, then process 1300 returns to act 1302 to display the pages of the digital book using the book display model rather than in the context display model.

However, if there is a narrower context level that can be displayed, then the digital book is displayed in the multiple display areas in a narrower context using the context display model (act 1318). For example, the display can transition to the next lower (narrower) context level display in act 1318. Process 1300 continues to display the digital book in this new context level using the context display model in act 1318 until a semantic zoom out or semantic zoom in request is received.

Figure 14:
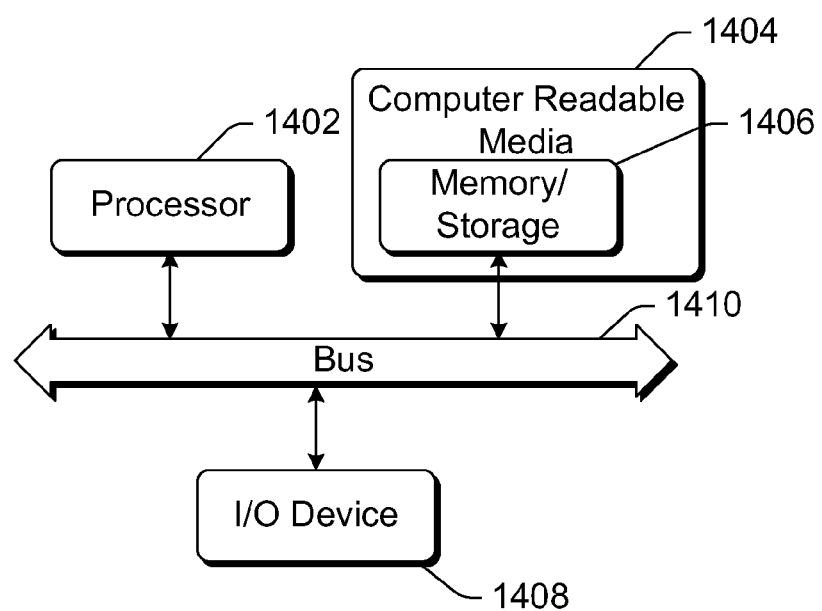
FIG. 14 illustrates an example computing device that can be configured to implement the integrating digital book and zoom interface displays in accordance with one or more embodiments.

FIG. 14 illustrates an example computing device 1400 that can be configured to implement the integrating digital book and zoom interface displays in accordance with one or more embodiments. Computing device 1400 can be, for example, computing device 102 of FIG. 1.

Computing device 1400 includes one or more processors or processing units 1402, one or more computer readable media 1404 which can include one or more memory and/or storage components 1406, one or more input/output (IPO) devices 1408, and a bus 1410 that allows the various components and devices to communicate with one another. Computer readable media 1404 and/or one or more I/O devices 1408 can be included as part of, or alternatively may be coupled to, computing device 1400. Bus 1410 represents one or more of several types of bus structures, including a memory bus or memory controller, a peripheral bus, an accelerated graphics port, a processor or local bus, and so forth using a variety of different bus architectures. Bus 1410 can include wired and/or wireless buses.

Memory/storage component 1406 represents one or more computer storage media. Component 1406 can include volatile media (such as random access memory (RAM)) and/or nonvolatile media (such as read only memory (ROM), Flash memory, optical disks, magnetic disks, and so forth). Component 1406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1402. It is to be appreciated that different instructions can be stored in different components of computing device 1400, such as in a processing unit 1402, in various cache memories of a processing unit 1402, in other cache memories of device 1400 (not shown), on other computer readable media, and so forth. Additionally, it is to be appreciated that the location where instructions are stored in computing device 1400 can change over time.

One or more input/output devices 1408 allow a user to enter commands and information to computing device 1400, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 14. The features of the integrating digital book and zoom interface displays techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media devices having stored thereon multiple instructions that, when executed by one or more processors of a device, cause the one or more processors to:
    display, in each of two display areas, different pages of a digital book using a book display model;
    display, in response to a request to semantically zoom out, the digital book in a broader context, the broader context using a context display model rather than the book display model;
    display, in response to a request to semantically zoom in, the digital book in the book display model rather than the context display model;
    receive a request to enter a scratchpad mode, and in response to the request:
        automatically combine the different pages of the digital book displayed in each of the two display areas for display in a first of the two display areas and clear at least a portion of a second of the two display areas;
        display, in the first of the two display areas, the combined different pages of the digital book that were previously displayed in both of the two display areas; and
        display, in the second of the two display areas, a collection of pages of the digital book that have been moved by a user of the device from the first of the two display areas to the second of the two display areas.

2. One or more computer storage media devices as recited in claim 1, wherein both the request to semantically zoom out and the request to semantically zoom in are user requests.

3. One or more computer storage media devices as recited in claim 1, wherein the instructions further cause the one or more processors to:
    display, in the second of the two display areas, a collection of digital books that have been selected by the user of the device from the digital book.

4. One or more computer storage media devices as recited in claim 1, wherein to display the digital book in the broader context is to display both a first page of the digital book and one or more pages preceding the first page in a first display area of the two display areas, and display both a second page of the digital book and one or more pages following the second page in a second display area of the two display areas.

5. One or more computer storage media devices as recited in claim 1, wherein to display the digital book in the broader context is to display the digital book in a first display area of the two display areas, and display multiple additional digital books in a second display area of the two display areas.

6. One or more computer storage media devices as recited in claim 5, wherein the multiple additional books comprise a collection of books selected by the user of the device in a scratchpad mode.

7. One or more computer storage media devices as recited in claim 1, wherein to display the digital book in the broader context is to display both the digital book and multiple additional books in a first display area of the two display areas, and further display additional digital books in a second display area of the two display areas.

8. One or more computer storage media devices as recited in claim 1, wherein the instructions further cause the one or more processors to display, in response to one or more additional requests to semantically zoom out, the digital book in one or more broader context levels.

9. One or more computer storage media devices as recited in claim 8, wherein the instructions further cause the one or more processors to, after receipt of the one or more additional requests to semantically zoom out, display the digital book in one or more narrower context levels in response to one or more additional requests to semantically zoom in.

10. One or more computer storage media devices as recited in claim 1, wherein the two display areas comprise two separate display components.

11. A method for displaying a user interface, the method comprising:
    displaying a first page of a digital book in a first display area and a second page of the digital book in a second display area;
    receiving a first semantic zoom out request;
    in response to the first semantic zoom out request, displaying both the first page of the digital book and a context of the first page in the first display area, and displaying both the second page of the digital book and a context of the second page in the second display area;
    receiving, after receiving the first semantic zoom out request, a second semantic zoom out request;
    displaying, in response to the second semantic zoom out request, the digital book in the first display area and multiple additional digital books in the second display area;
    receiving a request to enter a scratchpad mode, and in response to the request:
        clearing at least a portion of the second display area by at least:
            automatically moving the multiple additional digital books in the second display area to the first display area;
            displaying the multiple additional digital books together with the digital book in the first display area; and
        displaying, in the second display area, a collection of pages of the digital book that have been moved by a user of the device from the first display area to the second display area.

12. A method as recited in claim 11, further comprising returning to displaying, in response to a user request, the first page of the digital book in the first display area and the second page of the digital book in the second display area.

13. A method as recited in claim 11, wherein the multiple additional digital books are selected according to one or more criteria.

14. A method as recited in claim 13, further comprising:
    receiving a user request to change the one or more criteria; and
    selecting, in response to the user request to change the one or more criteria, different digital books as the multiple additional digital books.

15. A method as recited in claim 11, further comprising:
    receiving, after receiving the second semantic zoom request, a third semantic zoom out request; and
    displaying, in response to the third semantic zoom out request, both the digital book and the multiple additional digital books in the first area, and displaying further additional digital books in the second display area.

16. A method as recited in claim 15, further comprising:
    receiving, after receiving the third semantic zoom out request, a first semantic zoom in request; and
    displaying, in response to the first semantic zoom in request, the digital book in the first display area, and displaying the multiple additional digital books in the second display area.

17. A method as recited in claim 16, further comprising:
    receiving, after receiving the first semantic zoom in request, a second semantic zoom in request;
    displaying, in response to the second semantic zoom in request, both the first page of the digital book and the context of the first page in the first display area, and both the second page of the digital book and the context of the second page in the second display area;
    receiving, after receiving the second semantic zoom in request, a third semantic zoom in request; and
    displaying, in response to the third semantic zoom in request, the first page without the context of the first page in the first display area, and the second page without the context of the second page in the second display area.

18. A method as recited in claim 11, further comprising:
    displaying, if the request to enter the scratchpad mode is received prior to receiving the second semantic zoom out request, both the first page and the context of the first page as well as both the second page and the context of the second page in the first display area.

19. A system comprising:
    one or more processors; and
    one or more computer storage media devices having stored thereon instructions that, when executed by the one or more processors, cause the one or more processors to perform operations including:
        displaying, in each of two display areas, different pages of a digital book using a book display model;
        displaying, in response to a request to semantically zoom out, the digital book in a broader context, the broader context using a context display model rather than the book display model;
        displaying, in response to a request to semantically zoom in, the digital book in the book display model rather than the context display model;
        receiving a request to enter a scratchpad mode, and in response to the request:
            automatically combining the different pages of the digital book displayed in each of the two display areas for display in a first of the two display areas and clearing at least a portion of a second of the two display areas;
            displaying, in the first of the two display areas, the combined different pages of the digital book that were previously displayed in both of the two display areas; and displaying, in the second of the two display areas, a collection of pages of the digital book that have been moved by a user from the first of the two display areas to the second of the two display areas.

20. A system as recited in claim 19, wherein the operations include displaying, in the second of the two display areas, a collection of digital books that have been selected by the user from the digital book.

\* \* \* \* \*